(12) United States Patent
Ference

(10) Patent No.: US 10,028,455 B2
(45) Date of Patent: Jul. 24, 2018

(54) WATERING DEVICE

(71) Applicant: Katharine G. Ference, Sewickley, PA (US)

(72) Inventor: Katharine G. Ference, Sewickley, PA (US)

( * ) Notice: Subject to any disclaimer, the term of this patent is extended or adjusted under 35 U.S.C. 154(b) by 327 days.

(21) Appl. No.: 14/788,421

(22) Filed: Jun. 30, 2015

(65) Prior Publication Data

US 2017/0000048 A1 Jan. 5, 2017

(51) Int. Cl.
*A01G 27/00* (2006.01)
*A47G 33/08* (2006.01)
*A47G 33/12* (2006.01)

(52) U.S. Cl.
CPC ....... *A01G 27/003* (2013.01); *A47G 33/0881* (2013.01); *A47G 2033/1293* (2013.01)

(58) Field of Classification Search
CPC .... A01G 27/00; A01G 27/001; A01G 27/003; A01G 27/005; A47G 33/0881; A47G 33/12; A47G 2033/1293; A47G 2033/1286
See application file for complete search history.

(56) References Cited

U.S. PATENT DOCUMENTS

| | | | | |
|---|---|---|---|---|
| 3,542,069 A * | 11/1970 | Ollison | A01G 27/001 | 119/51.15 |
| 4,825,587 A * | 5/1989 | Stancil | A47G 33/12 | 47/40.5 |
| 4,930,252 A * | 6/1990 | Krause | A47G 33/12 | 47/40.5 |
| 5,157,868 A * | 10/1992 | Munoz | A01G 27/005 | 47/40.5 |
| 5,473,837 A * | 12/1995 | Skoczylas | A01G 27/003 | 47/40.5 |
| 5,857,484 A * | 1/1999 | Davidian | A01G 27/005 | 137/454 |
| 5,867,929 A * | 2/1999 | Jung | A01G 27/006 | 47/40.5 |
| 6,082,043 A * | 7/2000 | Andrews | A01G 27/006 | 340/618 |
| 6,405,480 B1 * | 6/2002 | Martin | A01G 7/06 | 47/40.5 |
| 6,497,071 B1 * | 12/2002 | Main | A01G 27/005 | 47/40.5 |
| 7,055,282 B2 * | 6/2006 | Bryan, III | A01G 31/06 | 47/62 R |

(Continued)

FOREIGN PATENT DOCUMENTS

WO    WO 2010110690 A1 *    9/2010    ........... A01G 27/003

*Primary Examiner* — Ruth Ilan

(57) ABSTRACT

One embodiment provides a system, including: an ornament assembly comprising: a fluid pump therein, wherein the fluid pump comprises an inlet and a discharge; a control mechanism operatively coupled to the fluid pump, wherein the control mechanism controls the fluid pump; a power source operatively coupled to control mechanism; and at least a first aperture and a second aperture; the first aperture being connected to the inlet of the fluid pump and having a connection mechanism for connecting a fluid transfer device; and the second aperture being connected to the discharge of the fluid pump and having a connection mechanism for connecting a fluid transfer device. Other aspects are described and claimed.

16 Claims, 6 Drawing Sheets

(56) References Cited

U.S. PATENT DOCUMENTS

| | | | | |
|---|---|---|---|---|
| 7,222,454 B1* | 5/2007 | Chen | .................... | A01G 27/003 47/48.5 |
| 7,757,435 B1* | 7/2010 | Boskofsky | ......... | A47G 33/0881 47/40.5 |
| 9,265,374 B2* | 2/2016 | Rasschaert | ............. | A47G 33/12 |
| 2002/0088176 A1* | 7/2002 | Gergek | ................ | A01G 27/003 47/79 |
| 2007/0089365 A1* | 4/2007 | Rowe | .................. | A01G 27/003 47/79 |
| 2008/0135647 A1* | 6/2008 | France | ................. | A01G 27/005 239/542 |
| 2016/0242369 A1* | 8/2016 | Caceres | .............. | A01G 27/005 |

\* cited by examiner

WATERING DEVICE

BACKGROUND

People may use plants or other things that need water as decorative objects. Typically, these plants or trees are located in a container that can hold water. In some cases, the container may additionally be filled with dirt which can hold water on the plant roots. When people use real trees for Christmas trees, these trees are frequently cut and placed in a Christmas tree stand which can additionally hold water. The tree, even though it is lacking roots, requires water to prevent the tree from drying out and becoming unsightly.

BRIEF SUMMARY

In summary, one aspect provides a system, comprising: an ornament assembly comprising: a fluid pump therein, wherein the fluid pump comprises an inlet and a discharge; a control mechanism operatively coupled to the fluid pump, wherein the control mechanism controls the fluid pump; a power source operatively coupled to control mechanism; and at least a first aperture and a second aperture; the first aperture being connected to the inlet of the fluid pump and having a connection mechanism for connecting a fluid transfer device; and the second aperture being connected to the discharge of the fluid pump and having a connection mechanism for connecting a fluid transfer device.

Another aspect provides a system, comprising: an ornament assembly comprising an attachment mechanism and further comprising: a water pump therein, wherein the water pump comprises an inlet and a discharge; a control mechanism operatively coupled to the water pump, wherein the control mechanism controls the water pump; a power source operatively coupled to control mechanism; and at least a first aperture and a second aperture; the first aperture being connected to the inlet of the water pump and having a connection mechanism for connecting a water transfer device; and the second aperture being located at a lower part of the ornament assembly and connected to the discharge of the water pump and having a connection mechanism for connecting a water transfer device a first section of tubing removably attached to the connection mechanism of the first aperture, wherein the first section of tubing transports fluid from a reservoir; and a second section of tubing removably attached to the connection mechanism of the second aperture, wherein the second section of tubing transports fluid to a reservoir.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
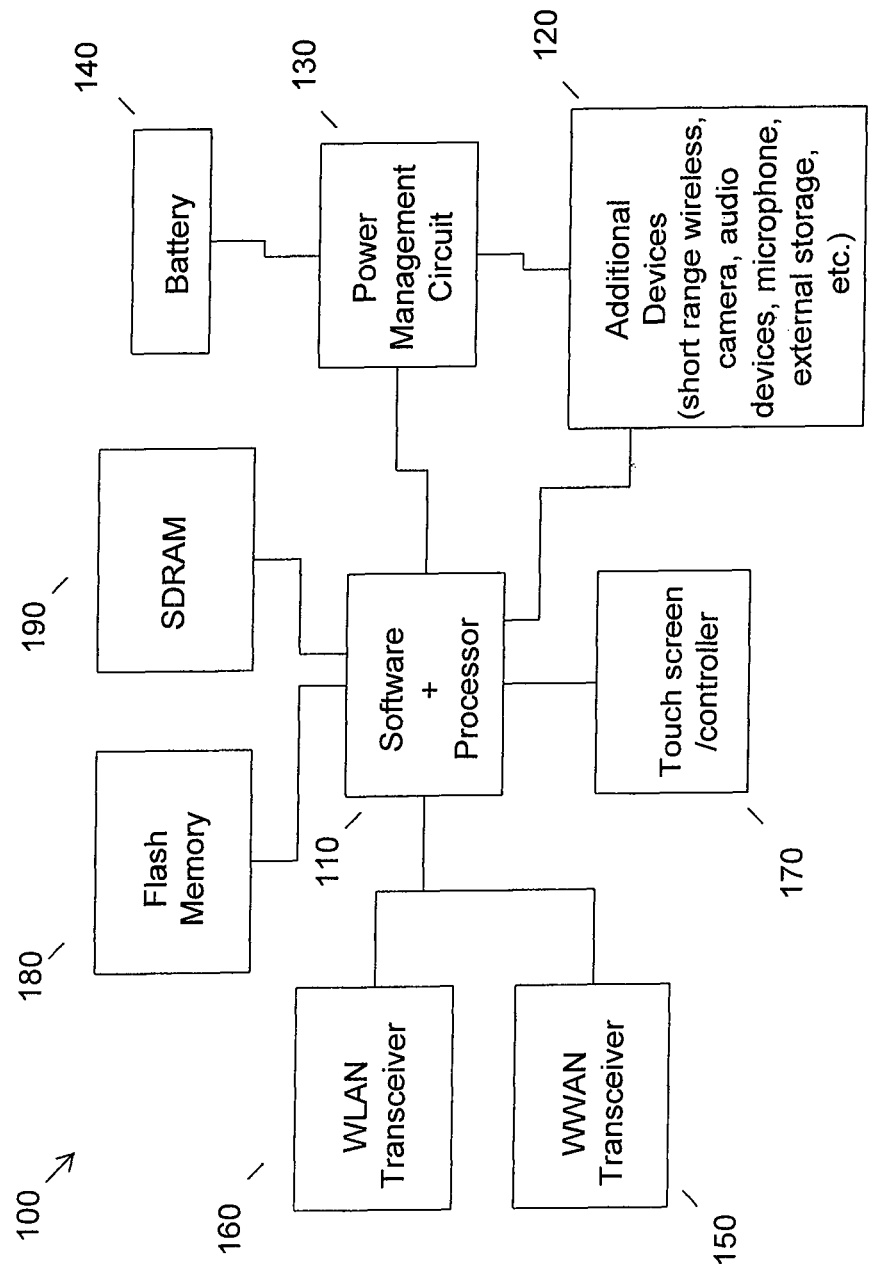
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

People like to have live plants and trees as decorative elements in their home. These plants and trees require water in order to keep them alive. In some cases watering these plants and trees may be difficult. For example, if the container holding the plant is on the floor, this requires that a person bend over with a heavy watering device in order to water the plants. Additionally, since some plants and trees require large amounts of water, the amount of water necessary may be too heavy to carry in a single trip, thereby requiring multiple trips. Additionally, some people like the look, feel, and/or smell of a real evergreen tree as a Christmas tree. In the case of a Christmas tree, the tree is normally located in a tree stand that includes a reservoir for holding water. Unfortunately, because these trees typically have needles and wider branches at the bottom of the tree towards the tree stand, watering them may be difficult and sometimes painful.

One current solution for easing the burden of watering plants or Christmas trees is a funnel like device. The funnel is generally attached to an upper portion of the plant with a tube going down the plant to the plant's container. This assists with the issues of bending down to water a plant. However, an issue with this approach is that the funnel cannot be very large because the branches of the plant may not be strong enough to hold a significant amount of weight, causing the watering to become more time consuming. This causes a new problem in that the person watering the plant has to hold the heavy weight of the water for a longer period of time which may additionally be at an elevation which may be uncomfortable for the person.

One solution to this new issue has been to provide a reservoir for holding the water. From the reservoir a tube (or other fluid transport device) is provided that can be placed in the plant container. The user then fills the reservoir and the water flows from the reservoir to the plant. The issue with this approach is that this method relies on a gravity feed system, meaning the reservoir has be located above the plant's container. This may not be a feasible option for every plant that a person may have.

Accordingly, an embodiment provides a method of providing water to a plant or tree using a pump system. The benefit of this approach over the current reservoir system is that the reservoir where the water is being drawn from does not have to be above the container holding the plant or tree. In other words, the reservoir could be on the floor and even if the water level in the reservoir is lower than the plant container, the system will still operate. The pump will create the suction required to cause the water to flow from the reservoir to the container holding the plant. The pump may be enclosed in a decorative ornament assembly that can be hung on a plant's branches. The benefit to this approach over the funnel approach is that the branches only have to hold the weight of the ornament assembly rather than the additional weight of the water or fluid.

In one embodiment, the activation of the pump may be accomplished using a control mechanism. In one embodiment, this control mechanism may be controlled by an electronic device (e.g., smart phone, tablet, smart watch, timer, etc.). For example, the control mechanism may be wirelessly connected to a user's smart phone. This wireless electronic control may allow a person to set the pump to run at a specified time or the person may not even have to approach the plant to water it. Additionally, this may allow a person to water the plant even if they are not at home.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
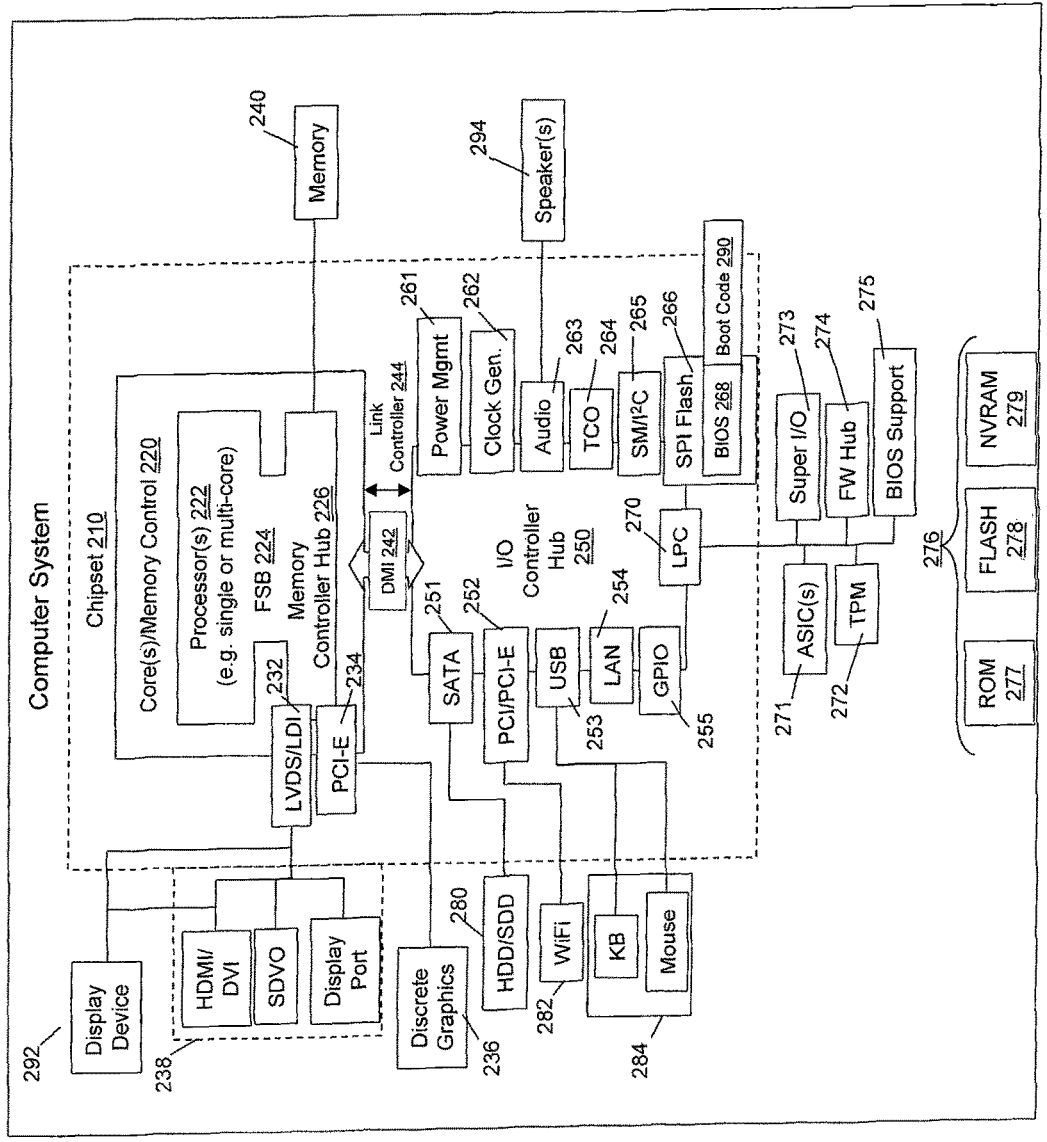
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to control an embodiment described herein. For example, the circuitry outlined in FIG. 1 may be implemented in a tablet or smart phone embodiment, whereas the circuitry outlined in FIG. 2 may be implemented in a personal computer embodiment.

In the explained embodiment, an example Christmas tree will be used for ease of explanation. However, it should be obvious to one skilled in the art that these teachings can be applied to more than just Christmas trees and can extend to anything that needs watered or fluid transported from one location to another, for example, decorative plants or trees.

Figure 3A:
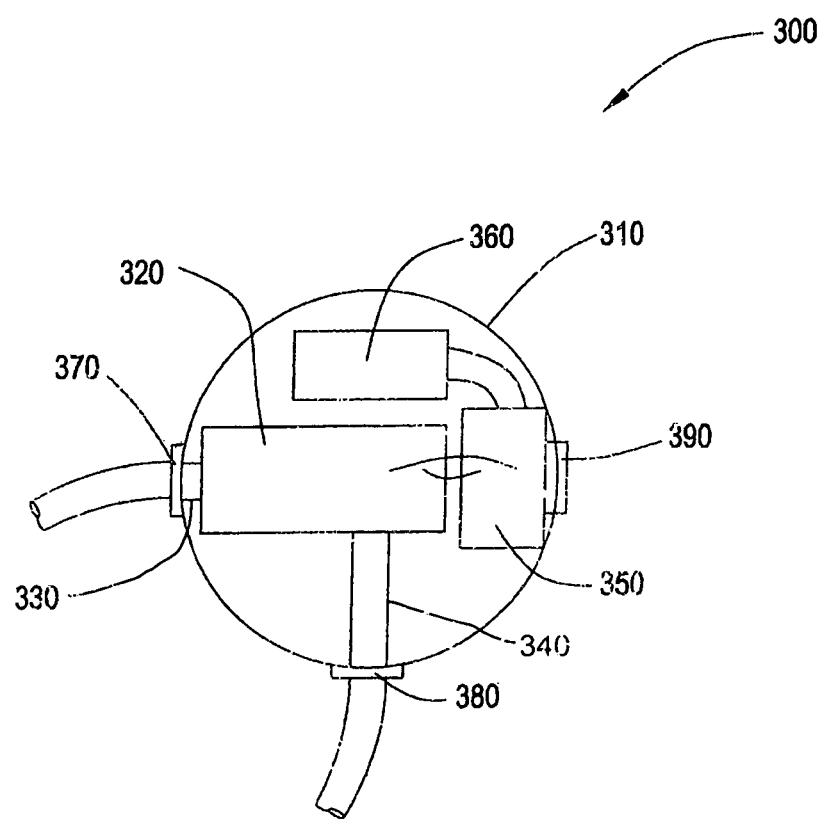
FIG. 3A-FIG. 3D illustrates an example watering device.
Figure 3B:
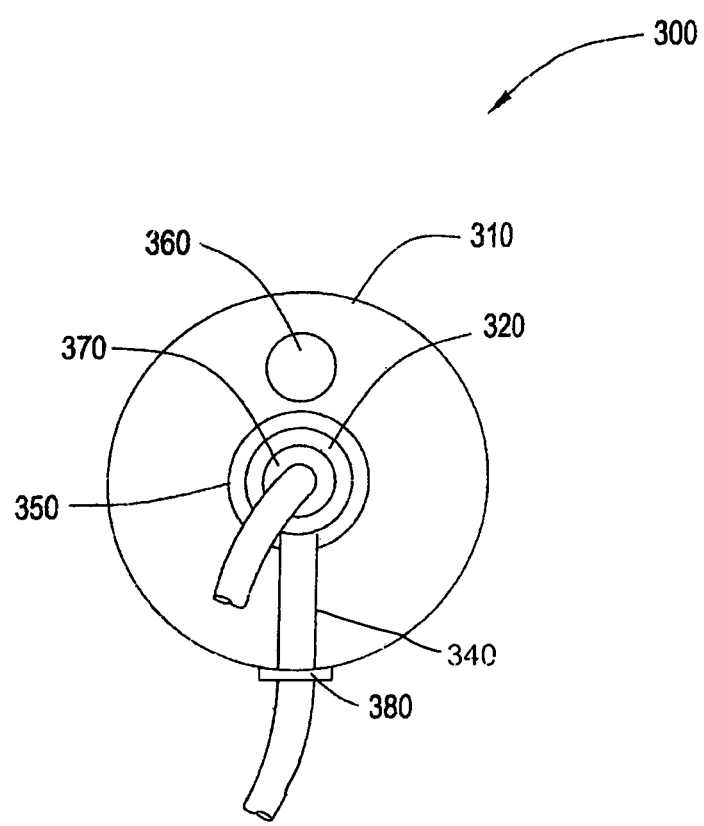
Figure 3C:
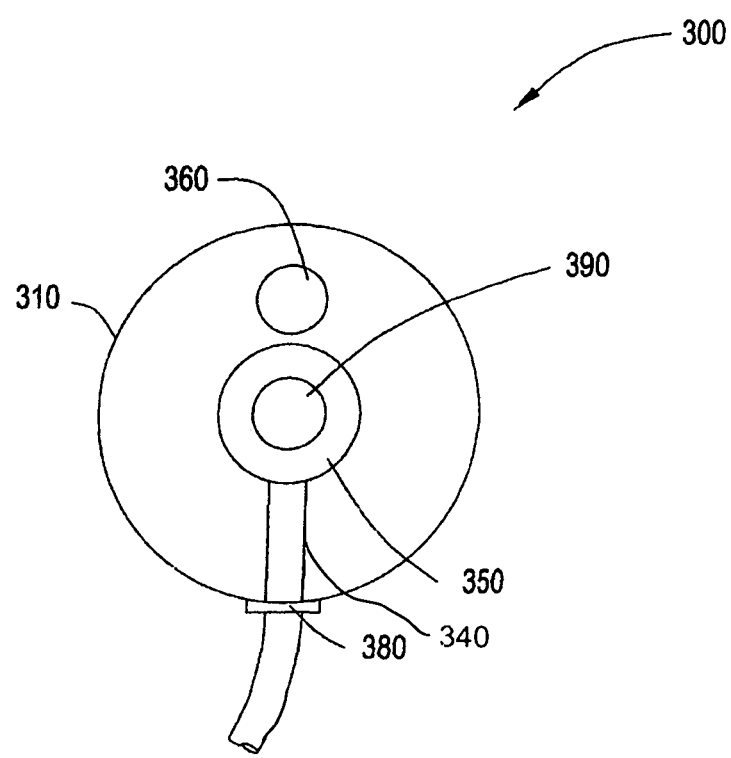
Figure 3D:
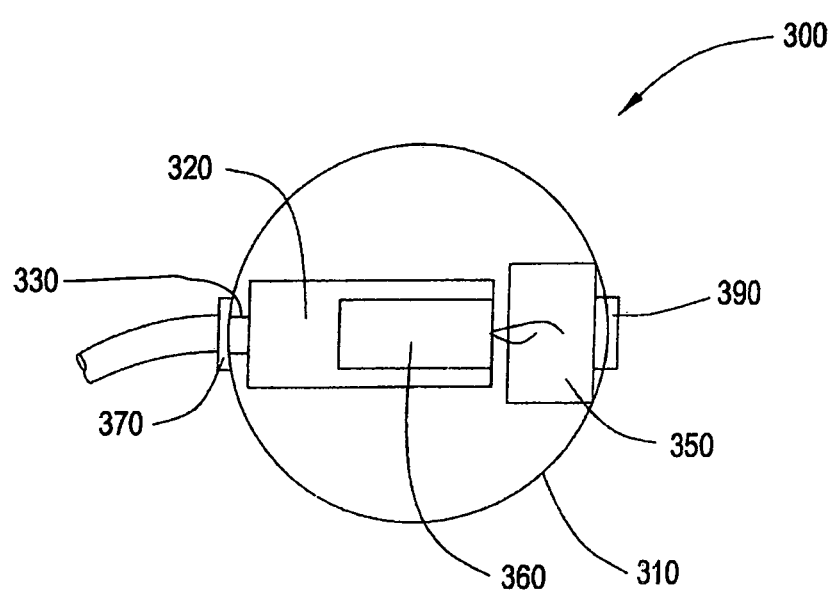

FIGS. 3A-3D show an example ornament assembly 300. FIGS. 3A-3C shows example side views. FIG. 3D shows an example top view. The example shown in FIGS. 3A-3D is only for illustrative purposes. Other arrangements and configurations including other parts or excluding parts shown are contemplated.

In one embodiment, the ornament assembly 300 may comprise an attachment mechanism. For example, the ornament assembly 300 may include a hook, clip, or other device which would allow a user to attach the ornament assembly 300 to a tree, plant, branch of the tree or plant, or other location. The ornament assembly 300 may comprise a housing 310 which may be of different shapes and designs. For example, the housing 310 may be designed in order to increase the aesthetic appeal of the assembly 300. For example, the housing 310 may be a decorative shape and design similar to a Christmas ornament. Alternatively, the housing 310 may be designed to be concealed by the Christmas tree. For example, the housing 310 may be green and a small shape intended to be hidden near the trunk of the tree. The housing 310 may comprise a single piece or may be made of multiple pieces. For example, the housing 310 may comprise two pieces that are connected together with fastening devices (e.g., screws, tabs, clasps, buttons, etc.). This may allow for ease of access to the internals in the case of troubleshooting, repair, cleaning, or for other reasons.

A fluid pump 320 may be contained within the housing 310. The fluid pump 320 may be any type of pump which can be used to pump fluids. In one embodiment the fluid pump 320 may be a water pump. The fluid pump 320 may comprise an inlet 330 and a discharge 340. Coupled to the fluid pump 320 may be a control mechanism 350. The control mechanism 350 may control the fluid pump 320. For example, with the control mechanism 350 in the "ON" position, the fluid pump 320 may operate. If a fluid is introduced to the system, this operation of the fluid pump 320 may cause a flow of fluid between the inlet 330 and discharge 340 of the fluid pump 302. With the control mechanism 350 in the "OFF" position, the fluid pump 320 may cease to operate. In other words, operation of the control mechanism 350 may cause the fluid pump 320 to turn off and on.

The control mechanism 350 may include a simple mechanical on/off switch, for example 390. In one embodiment, the control mechanism 350 may comprise an electronic controller, for example, an embedded controller, microprocessor chip, combination of controller chips, or the like. In one embodiment, the electronic controller may be controlled by an information handling device (e.g., timer, smart phone, smart watch, tablet, etc.). For example, in one embodiment the control mechanism may communicate wirelessly with a user's smart phone. Using the information handling device a user may be able to control the control mechanism 350, thereby causing the fluid pump 320 to turn off and on. In other words, using the information handling device a user may be able to water the Christmas tree without having to be near the tree.

The electronic device may be associated with an electronic system or a system which communicates with systems in the house over the internet. For example, a user may a system which allows the user to control elements of their house, for example, WINK, CONTROL4, or other similar home control systems, that an embodiment may connect with. WINK is a registered trademark of Wink, Inc. in the United States and other countries. CONTROL4 is a registered trademark of Control4 Corporation in the United States and other countries. Other control mechanisms 350 are known in the art and are contemplated.

Coupled to the control mechanism 350 may be a power source 360. This power source 360 may provide the power required to run the fluid pump 320. Additionally, this power source 360 may provide the power required to run the control mechanism 350 if the control mechanism requires electrical power. Alternatively, an embodiment may comprise two different power sources to provide power to the fluid pump 320 and the control mechanism 350 individually. The power source 360, in one embodiment, may comprise a battery. This battery may be a conventional household battery, for example, AA, AAA, C, similar type of battery, or multiple batteries. Alternatively, the battery may be a battery pack.

The power source 360 may alternatively comprise a more complicated system which uses alternating current (AC) power. In one embodiment, this type of power source 360 may comprise a power supply which uses AC power. The power source 360 may comprise an AC/DC converter which converts AC power to DC (direct current) power. The power source 360 may comprise a step-down transformer. The power source 360 may comprise a voltage splitter. The power source 360 may comprise additional circuits which supply one voltage or voltage type to the fluid pump 320, for example, if the fluid pump 320 requires AC power, and one voltage or voltage type to the control mechanism 350, for example, if the control mechanism 350 requires DC voltage. In an embodiment operating using AC power, the embodiment may additionally comprise a power plug. This power plug may be plugged into a typical AC receptacle, for example, at the end of a light string on the tree or in a wall outlet.

In one embodiment, the assembly 300 may include a speaker which may be used to provide sound. For example, one embodiment may include a circuit which plays music or makes a sound while the fluid pump 320 is operating. As another example, an embodiment may make a sound when the fluid pump 320 has turned on and another when the fluid pump 320 has turned off. In such an embodiment, the power source 360 may additionally provide power to speaker and associated circuit. In one embodiment a microphone may be included, allowing a user to program a certain sound or noise to be played. For example, a user may record their voice to be played when the fluid pump 320 is turned on.

The assembly 300 may additionally comprise a first aperture 370 and a second aperture 380. These apertures 370 and 380 may be through the housing. In one embodiment the first aperture 370 may be connected to the inlet 330 of the fluid pump 320. The second aperture 380 may be connected to the discharge 340 of the fluid pump 320. The connection may be a direct connection, for example, the fluid pump 320 may be positioned in such a way in the housing 310 that the inlet 330 and discharge 340 are touching the housing 310. Alternatively, an embodiment may comprise a connection mechanism for the inlet 330 and discharge 340 to connect them to the apertures 370 and 380. The apertures 370 and 380 may include a connection mechanism for connecting a fluid transfer device (e.g., tubing, piping, etc.). For example, the connection mechanism may be a threaded fitting, compression fitting, or other type of connection mechanism.

The apertures 370 and 380 may be positioned in different locations on the ornament assembly 300. For example, the apertures 370 and 380 may be located at opposite sides of the ornament assembly 300 (e.g., top and bottom, left and right side, etc.). Alternatively, in one embodiment the second aperture 380 may be located at a lower portion of the ornament assembly 300, for example, on the bottom. This may assist in providing an efficient fluid flow.

One embodiment may additionally comprise a fluid transport device (e.g., tubing, piping, etc.). The term tubing will be used for ease in readability, but the other types of fluid transport devices are contemplated. One embodiment may additionally comprise a first and second section of tubing. One section of tubing may be connected to the first aperture 370 and the second section of tubing may be connected to the second aperture 380. The first section of tubing may provide a fluid transport device for fluid from a reservoir (e.g., a bucket or other container on the floor or table). The second section of tubing may provide a fluid transport device from the ornament assembly 300 to the tree container or water reservoir. This second tubing may include some attachment mechanisms for attaching the tubing to the tree. For example, if a user wants the tubing to follow the trunk of the tree, an embodiment might include attachment mechanisms for accomplishing this.

In one embodiment, the second section of tubing may comprise a sensor. This sensor may be a water level sensor that detects when the water level of the tree reservoir is below a particular level. This sensor may be connected to the control mechanism 350 and may send a signal to the control mechanism 350 to activate the fluid pump 320 if the sensor gets below a certain level. This sensor may include more than one sensor. One sensor may be used to detect if the water level is below a certain level and the other may detect whether it is above a certain level. For example, if the water level drops below a bottom sensor, this may activate the fluid pump 320. Once the water level rises to the level of the second sensor, the fluid pump 320 may be turned off. A sensor could also be located on the first section of tubing which may alert the user when the level of the reservoir needs to be refilled.

Accordingly, as illustrated by the example embodiments and the figures, an embodiment provides a method for watering a plant without requiring the user to lift the heavy water or touch the plant. Additionally, a single reservoir can be used to water multiple plants and trees which may reduce the number of trips a user has to make with heavy water and additionally reduces the amount of time a user spends in watering all the plants. The user can just fill up a single reservoir and water all their plants at the same time. Using the pump system described herein the reservoir can be placed in any convenient location without having to worry about whether a gravity feed system will work. Additionally, using the electronically controlled embodiment allows a user to water their plants and trees even when they are away from home. Thus, the embodiments described provide a more efficient way of watering plants and Christmas trees.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A soil-less watering system, comprising:
   an ornament assembly housing, wherein the ornament assembly housing encloses at least:
   a fluid pump, wherein the fluid pump comprises an inlet and a discharge;
   a control mechanism operatively coupled to the fluid pump, wherein the control mechanism controls the fluid pump and wherein the control mechanism is electronically controlled by a home control system;
   at least one power source operatively coupled to the control mechanism, wherein at least one of the at least one power source comprises a light string;
   the at least one power source providing at least two power outputs, one power output comprising alternating current and another power output comprising direct current;
   a speaker powered using direct current;
   a microphone powered using direct current; and
   at least a first aperture and a second aperture, each located through a wall of the ornament assembly housing;
   the first aperture being connected to the inlet of the fluid pump and having a connection mechanism for connecting a fluid transfer device; and
   the second aperture being connected to the discharge of the fluid pump and having a connection mechanism for connecting a second fluid transfer device; and
   an attachment mechanism for attaching the ornament assembly to a branch of a plant.

2. The system of claim 1, wherein the fluid pump comprises a water pump.

3. The system of claim 1, wherein the second aperture is located at a lower part of the ornament assembly.

4. The system of claim 1, further comprising a first section of tubing removably attached to the connection mechanism of the first aperture and a second section of tubing removably attached to the connection mechanism of the second aperture.

5. The system of claim 4, further comprising a sensor operatively coupled to a lower portion of the second section of tubing, wherein the sensor comprises a water level sensor that detects a water level of water within a reservoir holding the plant.

6. The system of claim 5, wherein the sensor is operatively connected to the control mechanism and wherein the control mechanism activates the fluid pump upon a signal from the sensor.

7. The system of claim 1, wherein at least one of the at least one power source comprises a battery.

8. The system of claim 1, wherein at least one of the at least one power source comprises a power supply.

9. The system of claim 8, further comprising a power plug.

10. A soil-less watering system, comprising:
    an ornament assembly comprising an attachment mechanism for attaching the ornament assembly to a plant and a housing, wherein the housing encloses at least:
    a water pump, wherein the water pump comprises an inlet and a discharge;
    a control mechanism operatively coupled to the water pump, wherein the control mechanism controls the water pump and wherein the control mechanism is electronically controlled by a home control system;
    at least one power source operatively coupled to the control mechanism, wherein at least one of the at least one power source comprises a light string;
    the at least one power source providing at least two power outputs, one power output comprising alternating current and another power output comprising direct current;
    a speaker powered using direct current;
    a microphone powered using direct current; and
    at least a first aperture and a second aperture, each located through a wall of the ornament assembly housing;
    the first aperture being connected to the inlet of the water pump and having a connection mechanism for connecting a water transfer device; and
    the second aperture being located at a lower part of the ornament assembly and connected to the discharge of the water pump and having a connection mechanism for connecting a water transfer device;
    a first section of tubing located outside the housing and removably attached to the connection mechanism of the first aperture, wherein the first section of tubing transports fluid from a reservoir; and
    a second section of tubing located outside the housing and removably attached to the connection mechanism of the second aperture, wherein the second section of tubing transports fluid to a water reservoir containing the plant.

11. The system of claim 10, further comprising a water level sensor operatively coupled to a lower portion of the second section of tubing, wherein the water level sensor detects a water level of water within the water reservoir.

12. The system of claim 11, wherein the sensor is operatively connected to the control mechanism and wherein the control mechanism activates the fluid pump upon a signal from the sensor.

13. The system of claim 10, wherein at least one of the at least one power source comprises a battery.

14. The system of claim 10, wherein at least one of the at least one power source comprises a power supply.

15. The system of claim 14, further comprising a power plug.

16. The system of claim 10, further comprising a plurality of attachment mechanisms for attaching at least one of the first section of tubing and the second section of tubing to the plant.

* * * * *